QUADRATURE ELIMINATOR AND SELECTIVE LAG CIRCUIT USING A SINGLE RECTIFIER RING AND HALF WAVE DISCRIMINATOR MODULATOR ACTION

Filed April 18, 1958

INVENTORS
Bock M. Chin
Vincent A. Orlando
BY William D. Roberson
Their Attorney

United States Patent Office 3,109,939

Patented Nov. 5, 1963

3,109,939

QUADRATURE ELIMINATOR AND SELECTIVE LAG CIRCUIT USING A SINGLE RECTIFIER RING AND HALF WAVE DISCRIMINATOR MODULATOR ACTION

Bock M. Chin, Boston, and Vincent A. Orlando, Melrose, Mass., assignors to General Electric Company, a corporation of New York Filed Apr. 18, 1958, Ser. No. 729,408
4 Claims. (Cl. 307—88.5)

Figures 1, 2, 3:
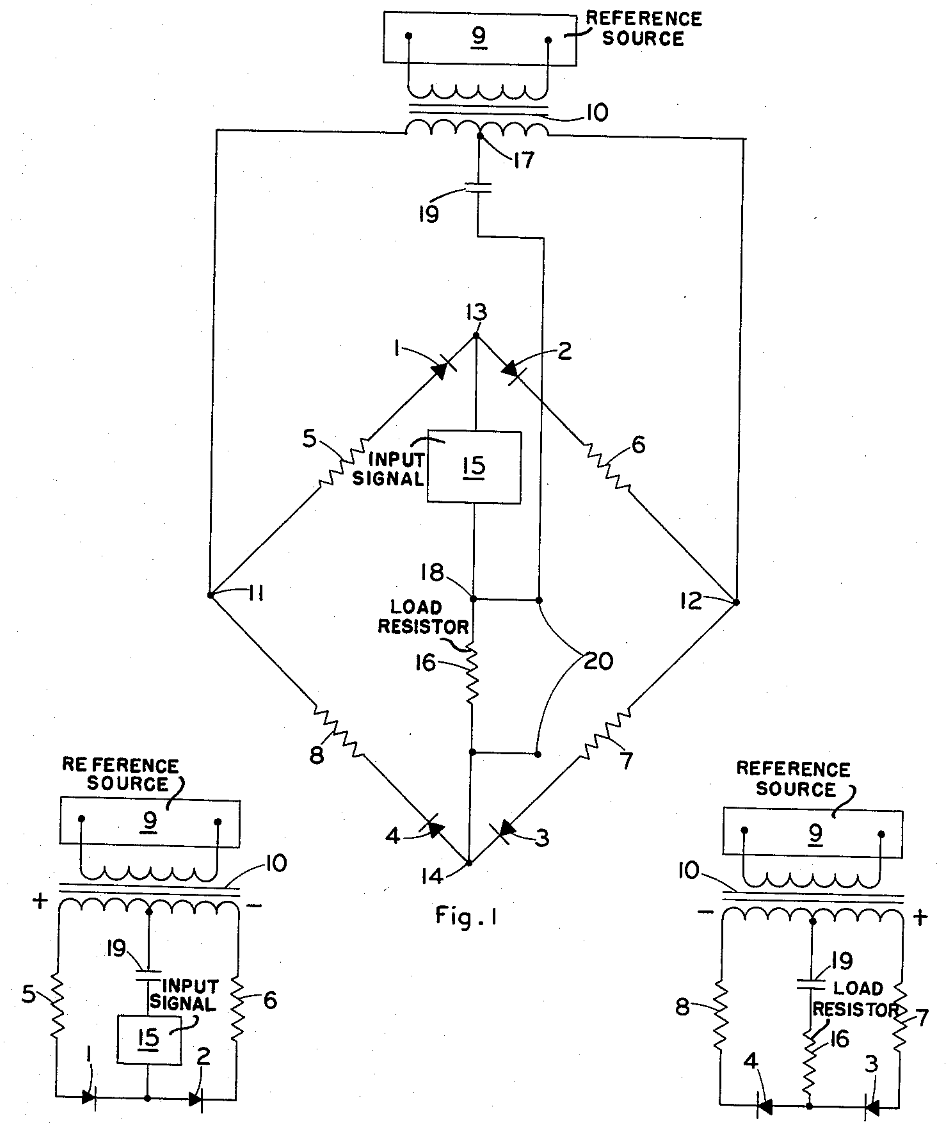

This invention relates to improved circuits for eliminating from a signal of a constant frequency those signal components bearing undesired phase relationships with respect to the signal being detected.

While not strictly limited thereto, the invention described herein has principal utility in servo systems wherein a detected signal of either of two opposite phase relationships relative to a reference signal and corresponding to a detected condition is amplified and utilized to drive a reversible two-phase servo motor to perform an indicating or control function in response to the measured condition. It is desirable to eliminate the quadrature component of the source signal because this component can saturate and reduce the gain of the amplifier. Under some circumstances it can also introduce errors into the servo system. Furthermore, the quadrature component of the detected signal, if amplified and applied to the servo motor, performs no work function therein since it can have no effect upon the drive but dissipates its energy by "cooking" the motor. By the very nature of a servo system, the quadrature component in the detected signal is almost always much greater than the detected signal itself, and the elimination of the quadrature component contributes significantly to the performance of the system.

One type of quadrature eliminator frequently employed has been constituted by a pair of rectifier rings connected as a discriminator and a modulator respectively. In such circuits, the ring discriminator functions to compare the input signal to a reference signal and to convert to a direct-current signal only the in-phase and 180°-out-of-phase components of the input signal. The direct-current output signal of the ring discriminator is then applied directly to the modulator ring which modulates the direct-current signal into an A.-C. output signal of the reference signal frequency. The A.-C. output signal may then be used to drive the two-phase servo motor in the servo system.

It is an object of this invention to provide an improved form of quadrature eliminator circuit having fewer components than circuits previously employed for accomplishing the same purpose.

It is a further object of this invention to provide a quadrature eliminator for servo systems which without requiring additional circuit elements function simultaneously to produce a signal lag between the input and output signals.

By way of a brief summary of but one aspect of the present invention, we employ a single rectifier ring comprising four rectifying elements poled to form a continuous current conducting path about the ring. At opposite points on the ring we connect a source of alternating reference potential, and at points conjugate to the aforementioned opposite points the input signal source is connected in series with a load resistor. As a departure from previous quadrature eliminators, we connect a condenser from a first point at the center tap of the source of reference potential to a second point between the input signal source and the load resistor. As will be shown, with such a circuit arrangement there appears across the load resistor an output signal free of the quadrature component of the input signal relative to the reference potential. This result is achieved by the use of a single rectifier ring having but four rectifying branches in place of the eight rectifying branches customarily employed for such purposes.

While the scope of this disclosure should not be limited except by a fair interpretation of the appended claims, further details of these teachings as well as additional objects and advantages will be better understood in connection with the accompanying drawings, wherein:

FIG. 1 represents a quadrature eliminator circuit constructed according to these teachings; and FIGS. 2 and 3 are schematic representations of portions of FIG. 1 illustrating the effect of a reversal of polarity of the reference signal upon the operation of the circuit.

In FIG. 1 there may be seen a rectifier ring of four unilaterally conducting elements 1, 2, 3 and 4, poled in a single direction to form a current-carrying path extending completely around the ring. Associated with each of the rectifiers in the ring is a current limiting resistor 5, 6, 7 and 8, which may or may not be required, depending on the circuit parameters and the nature of the rectifiers themselves. In the schematic diagram these resistances may represent simply the resistance of the rectifying elements in each branch of the ring. A source 9 of reference potential is connected through a center-tapped isolating transformer 10 across opposite points 11 and 12 of the rectifier ring. Between alternate opposite points 13 and 14 conjugate to points 11 and 12, the source of input signal potential 15 is connected in series with a load impedance, which in this instance is resistor 16. Between the center tap 17 of the isolating transformer, which is for all intents and purposes the center tap of the source of reference potential, and the point 18 between the input signal source and the load resistor, a capacitor 19 is connected.

This circuit contains but one rectifier ring constituted of portions which function in the nature of a half-wave discriminator and a half-wave modulator. It is part of the function of capacitor 19 to store a net charge during one-half cycle of the reference signal, during which time the circuit functions as a discriminator, and to release a portion of its net charge during the next half cycle of the reference potential while the circuit functions as a modulator of the potential on the capacitor. The capacitor is enabled to perform in this manner because of the switching action of the rectifier ring under the influence of the reference signal, which effectively connects the capacitor first in series circuit with the input signal and then in series with the load resistor 16. The phasing of the reference potential is, of course, critical, since input signals at phase quadrature with respect to it will be rejected by the discriminator and only those components of the input signal which are in phase or 180° out of phase with the reference signal will result in placing a net charge on the capacitor 19. During that cycle of the reference potential when the circuit functions as a discriminator, the quadrature component of the input signal may cause significant variations in the instantaneous charge on the capacitor. However, it is not the instantaneous charge on this capacitor but the charge left on it when the reference potential reverses its polarity that is responsible for the output signal produced by the modulator portion of the circuit.

FIGS. 2 and 3 will help to demonstrate and clarify the action of the circuit shown in FIG. 1. FIG. 2 represents the effective circuit of FIG. 1 when the polarity of the reference potential is positive on the left of the output winding of the isolating transformer 10 and negative on the right. This portion of the circuit functions as a half-wave discriminator. Assuming that the reference potential is greater at any instant than the instantaneous value of the input signal, the branches of the rectifier ring, including rectifiers 3 and 4 of FIG. 1, will not be conducting, and these two branches as well as resistor 16 may be ignored for the moment. With both rectifiers 1 and 2 conducting, those portions of the input signal from source 15 which are in phase or 180° out of phase with the reference potential are permitted to charge capacitor 19 through the two branches of the circuit including rectifiers 1 and 2 and current-limiting resistors 5 and 6. The polarity of the charge on the capacitor will depend on whether the input signal is in phase or 180° out of phase with the reference signal.

Any input signal may, of course, be considered to be composed of an in-phase component relative to the reference potential and a quadrature component. For purposes of this discussion, a signal which is 180° out of phase with the input signal will be considered to be an in-phase component and components which are out of phase by 90° or 270° constitute the quadrature component. The in-phase component of the input signal will result in placing a net charge on condenser 19 during the half cycle of the reference potential when the circuit functions as FIG. 2. The guadrature component will, however, result in no net charge being placed on the capacitor 19 since this component will drain as much charge as it places on the condenser.

During the next half cycle of the reference potential when the polarities on the output winding of the isolating transformer 10 are positive on the right and negative on the left, the branches of the rectifier ring including rectifiers 1 and 2 may be ignored, since both of these rectifiers cannot conduct. At such a time the circuit of FIG. 1 is effectively as shown in FIG. 3 and functions as a modulator. It will be noted that during this half cycle of the reference potential the input signal source is effectively removed from the circuit, and the capacitor 19 is placed by the switching action of the rectifier ring in series with the load resistor 16. It can be seen that the polarity of the charge placed on capacitor 19 during the first half cycle of the reference potential will depend upon the polarity of the input signal. Consequently, the polarity of the charge on capacitor 19 will determine whether the phasing of the output signal produced by the half-wave modulating action of the rectifier ring in the second cycle of the reference potential is exactly in phase or 180° out of phase with the reference potential. Across load resistor 16 there appears, therefore, a modulated output signal free from guadrature components. This signal may be taken off through terminals 20, filtered and/or amplified to provide power to the control phase winding of a two-phase servo motor.

The reduction in circuit components is a direct result of the unique switching action which takes place in the circuit, permitting it to function alternately to charge the capacitor from the proper component of the input signal and then to modulate the discharge of the capacitor. By the application of these principles the quadrature eliminator circuit described accomplishes purposes heretofore achieved only by the use of a larger number of components. At least as important as the reduction in the number of rectifier elements in the circuit is the fact that but a single isolating transformer has been required to connect the source of reference potential into the circuit, whereas heretofore either two transformers or a single transformer with a pair of output windings have been required.

The quadrature eliminator described offers a bonus by introducing a lag into the signal output which is very useful in some servo systems for stabilization. This lag, which may be adjusted merely by varying the values of resistance and/or the capacitance in the circuit, is acquired, furthermore, without the provision of a single additional circuit element. The lag comes about on the one hand because of the time required for the input signal to bring the capacitor up to full charge through resistors 5 and 6, and on the other hand because of the time required to discharge the capacitor through the load resistor and resistors 7 and 8. If the product of capacitance and resistance is sufficiently small, the lag introduced may be neglected, where that is desired, but merely increasing the value either of the resistances in the circuit or of the capacitance will result in an increased lag.

Although a single preferred embodiment has been described, certain variations in circuitry within the principles of this invention will doubtless occur to those skilled in the art to which these teachings pertain. Thus, for example, the circuit described functions within itself as a quadrature eliminator, but it may be employed to eliminate undesired signals having other phase relationships merely by employing well known phase-shifting techniques to vary the phase characteristics of the reference potential. The reference potential can be coupled into the circuit otherwise than through an isolating transformer; it may be preferable in some instances, for example, to employ a center-tapped resistance instead of the transformer. While in this instance the provision of a load resistance is thought to be the most practical way of developing the output signal, other impedance elements could also be employed, and the load impedance could simply be constituted by the grid circuit of an amplifier.

What we claim as new and desire to secure by Letters Patent of the United States is:

1. A quadrature signal eliminator and selective lag circuit comprising: in combination, a center-tapped circuit adapted to be energized by a source of periodically varying reference potential; a first pair of rectifier elements connected in series across said reference potential circuit and poled in a single current-carrying direction; a second pair of rectifier elements connected in series across said reference potential source and poled in an opposite current-carrying direction to that of said first pair; means to connect a source of input signals containing undesired signal components at phase quadrature to said reference potential; capacitance means; and load impedance means, said input signal source and said capacitance means being connected in series directly between a point between said first pair of rectifier elements and the center tap of said reference potential source in that order, and said load impedance means and said capacitance means being connected in series directly between a point between said second pair of rectifier elements and the center tap of said reference potential source in that order, such that said first pair of rectifier elements operates as a discriminator to charge said capacitance means from all but the quadrature components of said input signal and said second pair of rectifier elements acts as a modulator of the potential across said capacitance means, supplying to said load impedance an output signal relatively free of said undesired signal components, said output signal being proportional in amplitude to said input signal, the magnitude of said capacitance means and circuit resistance provided being such that they furnish in combination the desired signal lag through said circuit, such values determining the time required for said capacitance means to charge and discharge through said circuit resistance to thus enable selective control of the signal lag through said circuit, whereby the same capacitance and circuit resistance in addition to being utilized in the provision of quadrature eliminator operation provide a desired selective signal lag through selection of the magnitude thereof.

2. A quadrature signal eliminator and selective lag circuit comprising: in combination, means to provide a source of periodically varying reference potential; means to connect a source of input signals containing undesired signal components at phase quadrature to said periodically varying reference potential; a capacitor; a load impedance; a half-wave discriminator connected to complete a circuit through said input signal source and said capacitor during one-half cycle of said reference potential to develop a signal across the said capacitor which is proportional to the amplitude of the desired components of the input signals; and a half-wave modulator connected to complete a direct circuit through said capacitor and said load impedance during the other half cycle of said reference potential, said reference potential modulating said capacitor voltage to provide an output signal proportional in amplitude to said desired components of the input signals, the magnitude of said capacitor and circuit resistance provided being such that they furnish in combination the desired signal lag through said circuit, such values determining the time required for said capacitor to charge and discharge through said circuit resistance to thus enable selective control of the signal lag through said circuit, whereby the same capacitor and circuit resistance in addition to being utilized in providing quadrature eliminator operation provide a desired selective signal lag through selection of the magnitudes thereof.

3. A discriminator-modulator circuit for eliminating electrical components at phase quadrature to a desired signal from a mixed signal source and providing a selective signal lag comprising: a rectifier ring including at least four unilaterally conducting elements disposed in respective branches thereof, said elements being poled to form a continuous current-conducting path in one direction about said ring; a center-tapped circuit adapted to be energized by a source of periodically varying reference potential and connected across said rectifier ring at opposite points thereon; input connections for signals containing undesired signal components; a load impedance; means connecting said input in series with said load impedance directly across opposite points of said rectifier ring conjugate to the points of connection of said reference potential source; and capacitance means connected between the center tap of said reference potential circuit and the point of connection between said load impedance and said input signal source, such that said rectifier ring is alternately switched by said reference potential to operate as a discriminator to charge said capacitor means from the components of said input signals which are in phase with said reference potential and as a modulator to discharge said capacitance means through said load impedance, thereby impressing a modulated output signal across said load impedance free of quadrature components of the input signal, said output signal having a frequency equal to that of the reference potential and an amplitude proportional to the amplitude of said in phase input signal, the magnitude of said capacitor and circuit resistance provided being such that they furnish in combination the desired signal lag through said circuit, such values determining the time required for said capacitor to charge and discharge through said circuit resistance to thus enable selective control of the signal lag through said circuit, whereby the same capacitor and circuit resistance in addition to being utilized in the provision of quadrature eliminator operation provide a desired selective signal lag through selection of the magnitudes thereof.

4. A discriminator-modulator circuit for eliminating electrical components at phase quadrature to a desired signal from a mixed signal source and providing a selective signal lag comprising: a rectifier ring including at least four unilaterally conducting elements disposed in respective branches thereof, said elements being poled to form a continuous current-conducting path in one direction about said ring; an isolating transformer having a center-tapped secondary winding connected across said rectifier ring at opposite points thereon; means to connect a source of periodically varying reference potential across the primary winding of said isolating transformer; a load resistor; means to connect an input signal in series with said load resistor directly across opposite points of said rectifier ring conjugate to the points of connection of the secondary winding of said isolating transformer; and a capacitor connected between the center tap of said transformer and the point of connection between said load resistor and said input signal source, said input signals containing signal components having undesired phase relationships to a desired input signal so that said rectifier ring is switched by said reference potential to charge said capacitor from the desired component of said input signal and as a modulator to discharge said capacitor through said load resistor to provide an output substantially free of the quadrature components of the input signal proportional in amplitude to said desired input signal, the magnitude of said capacitor and circuit resistance provided being such that they furnish in combination the desired signal lag through said circuit, such values determining the time required for said capacitor to charge and discharge through said circuit resistance to thus enable selective control of the signal lag through said circuit, whereby the same capacitor and circuit resistance in addition to being utilized in the provision of quadrature eliminator operation provide a desired selective signal lag through selection of the magnitudes thereof.

References Cited in the file of this patent

UNITED STATES PATENTS

| | | |
|---|---|---|
| 2,716,891 | Stuart | Sept. 6, 1955 |
| 2,829,251 | Patton | Apr. 1, 1958 |
| 2,857,562 | Umrath | Oct. 21, 1958 |
| 2,887,636 | La Hue et al. | May 19, 1959 |
| 2,982,867 | Wennerberg | May 2, 1961 |

OTHER REFERENCES

Seely: "Electron-Tube Circuits," published 1950, McGraw-Hill Book Co. Inc., New York, pages 128–133.